UNITED STATES PATENT OFFICE.

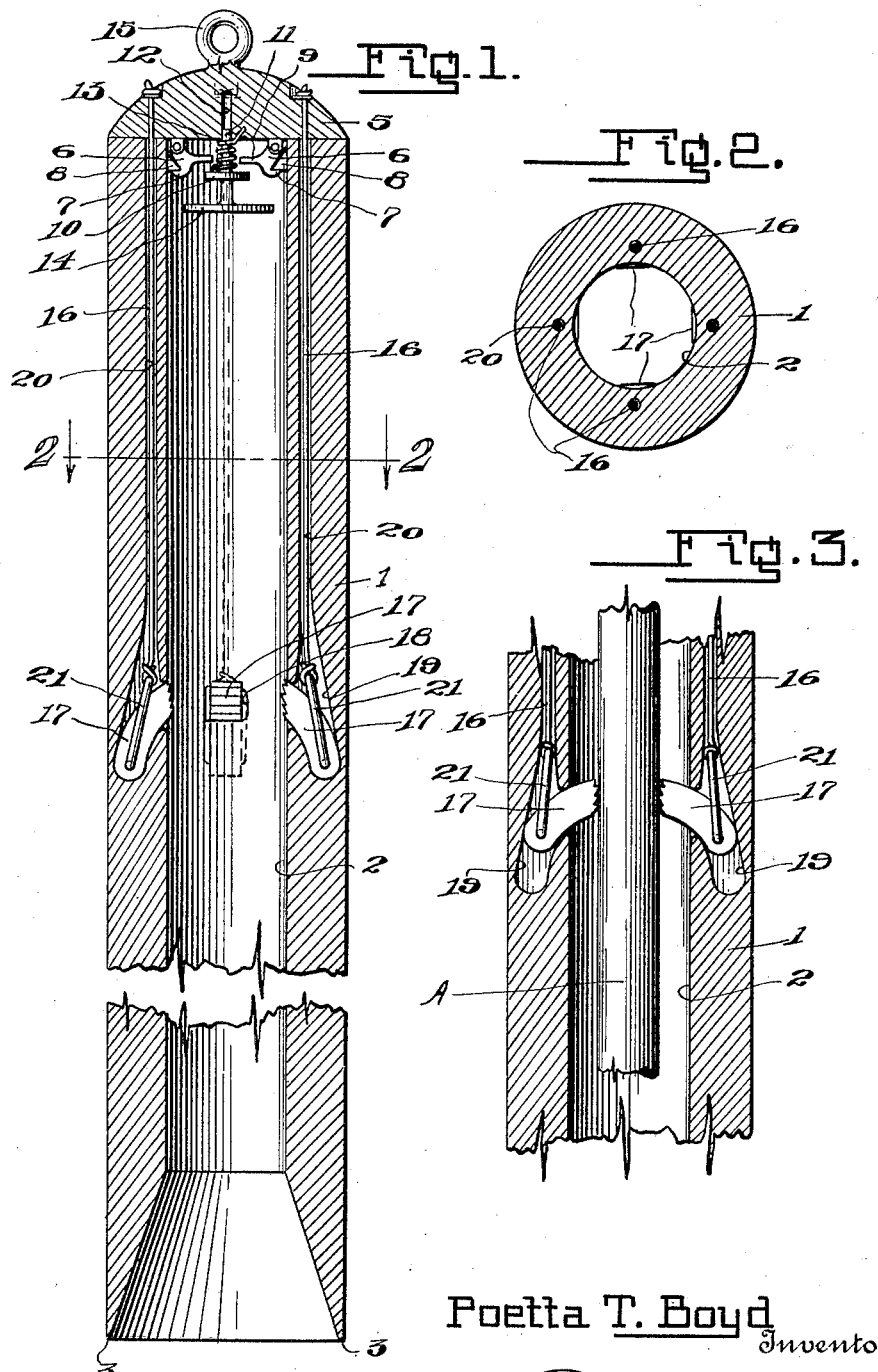

POETTA TRENT BOYD, OF ELDORADO, KANSAS.

FISHING-TOOL.

1,326,566.	Specification of Letters Patent.	Patented Dec. 30, 1919.

Application filed March 19, 1919. Serial No. 283,612.

*To all whom it may concern:*

Be it known that I, POETTA TRENT BOYD, a citizen of the United States, residing at Eldorado, in the county of Butler and State of Kansas, have invented certain new and useful Improvements in Fishing-Tools, of which the following is a specification.

This invention relates to fishing tools, for use in connection with oil and other deep wells, and an object of the invention is to provide a simple, compact fishing tool which is adapted to automatically grip a portion of a sucker-rod or other device in the tubing of deep wells.

The greater per cent. of trouble experienced in what are known as shallow oil wells are due to the parting of sections of the sucker rod and it is sometimes a very difficult problem to remove the lower part of the rod from the well in order to make the necessary repairs. Quite frequently it is necessary to pull a string of several hundred feet of the well tubing or casing in order to get the lower part of the sucker rod. This is particularly true in cases where the hub or connection of the sucker rod section is broken off, for the approved type of fishing tool now in use will not handle the sucker rod unless the hub is intact.

It is an object of this invention to provide a fishing tool which will firmly grip a sucker rod, and by means of which tool the said sucker rod may be withdrawn from the tubing, regardless of the condition of the hub or connection thereof.

Other objects of the invention will appear in the following detailed description taken in connection with the accompanying drawings, forming a part of this specification and in which drawings:

Figure 1 is a longitudinal section through the improved fishing tool.

Fig. 2 is a cross section on the line 2—2 of Fig. 1, and

Fig. 3 is a fragmentary longitudinal section through the fishing tool showing it gripping a portion of a sucker rod.

Referring more particularly to the drawings, 1 indicates a main body of the fishing tool which is cylindrical in shape, having its bore 2 of sufficient size to permit the insertion of the sucker rod, a portion of which is indicated at A, into the body, and which bore is also large enough to accommodate the hubs or connections of the various sections of a sucker-rod. The bore 2 of the cylindrical body 1 tapers outwardly, at the lower end of the body, forming a sharpened edge as indicated at 3, at the lower end of the body, and also forming a tapering guide or throat for guiding a sucker-rod into the cylindrical body.

The cap 5 is mounted upon the upper end of the cylindrical body 1 and it has a pair of dogs or pawls 6 pivotally carried thereby, the nibs 7 of which engage suitable lugs 8 carried by the cylindrical body 1, near the upper end thereof, for connecting the cap 5 to the body 1. The pawls or dogs 6 have inwardly extending tongues 9 formed thereon which are positioned in the path of a disk 10. The disk 10 is carried by a stem 11 which is slidably seated in an opening 12 formed axially within the cap 5. The stem 11 is normally held in its projecting or downward position by a spring 13 which is coiled about the pin and has one end connected to the cap and the other end connected to the disk 10. A second disk 14, which is relatively larger than the disk 10 is mounted upon the lower end of the stem 11 and during use of the fishing tool; when a sucker rod is inserted into the bore of a cylindrical body 1 and the upper end of the sucker rod engages the disk 14, the downward movement of the fishing tool will force the pin 11 upwardly in the bore 12, causing the disk 10 to engage the tongues 9 and rock the pawls or dogs 6, moving their nibs 7 out of engagement with the lugs 8 and disconnecting the cap 5 from the cylindrical body 1. The cap 5 has a ring 15 connected thereto or formed thereupon with which the operating cable or rod of the tool is connected. When the cap 5 is disconnected from the cylindrical body 1, upward pull upon the cap 5 will move the cables 16 upwardly, forcing the pawls 17 outwardly through the openings 18, into the bore 2 of the cylindrical body 1, for engagement with the sucker rod or analogous article as shown in Fig. 3 of the drawings. The inner ends of the pawls 17 are serrated, so as to provide a firm grip upon the sucker rod or analogous article. The pawls 17 are seated in pockets 19 formed within the cylindrical body 1 and which pockets open out into the bore of the body and also into longitudinally extending relatively small bores 20 through which the cables 16 extend. The cables 16 may be connected with the cap 5 in any suitable manner and they are connected to the pawls 17 through the medium of the links 21 so that upon the upwardly pull upon the cap 5, the pawls will be forced outwardly to grip the article within the bore of the body 1. Any desired number of the pawls 17 may be provided, but preferably four arranged in diametrically opposed pairs are provided so as to maintain a firm grip upon the sucker rod. In assembling the tool, the pawls 17 may be positioned, with their normally inner ends at the mouth of the pockets 19 and the cables drawn into the bore 2 and connected to the links 21 in any suitable manner, such as by ties, after which the ends of the links could be sprung into the pawls and then upon upward pull upon the cables, the pawls could be drawn into the pockets.

In operation; in case a sucker rod becomes broken in an oil well, the improved fishing tool is dropped downwardly in the tubing of the well and the forming of the relatively sharp edges 3, will permit the cylindrical body 1 to pass over the upper end of the sucker rod and the falling of the body downwardly about the sucker rod will cause the sucker rod to engage the disk 14 and move this disk, together with the disk 10 upwardly, releasing the dogs 6 and disconnecting the cap 5 from the cylindrical body 1, at which time the weight of the cylindrical body will move it downwardly until the pawls 17 move into binding or gripping engagement with the sucker rod at which time the further downward movement of the tool will be arrested, and then when an upward pull is administered to the tool, the sucker rod A will be drawn upwardly with the tool, owing to the fact that the serrated faces of the pawls 17 are arranged to firmly grip the sucker rod and so that the greater the strain or upward pull upon the tool becomes, the more firm will be the biting engagement of the pawls upon the sucker rod.

Changes in details may be made without departing from the spirit of this invention, but;

I claim:

1. A fishing tool comprising a body, a cap, means detachably connecting said cap to said body, and article gripping pawls carried by the body, and means for projecting said pawls into article gripping position upon separation of the cap and body.

2. A fishing tool comprising a body, a cap, means detachably connecting said cap to the body, article gripping pawls carried by the body, means for projecting said pawls into article gripping position upon separation of the cap and body, and means operable by being struck by an article inserted into said body to operate said connecting means to release the connection between the cap and body.

3. A fishing tool comprising a body, a cap, means detachably connecting said cap and said body, and means operable by being struck by an article inserted into said body to operate said connecting means to release the connection between the cap and body.

4. A fishing tool comprising a body, a cap, means detachably connecting said cap and said body, means operable by being struck by an article inserted into said body to operate said connecting means to release the connection between the cap and body, article gripping means carried by said body and normally maintaining an article non-gripping position, and means connecting said article gripping means and said cap to move the article gripping means into gripping relation with an article upon separation of the cap and body.

5. A fishing tool comprising a body, a cap, means detachably connecting said cap to said body, article gripping pawls carried by the body and normally lying in article non-gripping positions, and means connecting said pawls to said cap whereby the pawls will be projected into article gripping position upon separation of the cap and body.

6. A fishing tool comprising a body, a cap, means detachably connecting said cap to said body, article gripping pawls carried by the body and normally lying in article non-gripping positions, and means connecting said pawls to said cap whereby the pawls will be projected into article gripping position upon separation of the cap and body, means detachably connecting said cap to said body, and means operable upon contact with an article inserted into said body to operate said connecting means to release connection between the cap and body.

7. In a fishing tool, a cylindrical body provided with a plurality of pockets, pawls normally resting in said pockets, said pockets opening out into the bore of the body to permit projection of the pawls into the body for gripping an article inserted in the body, a cap on said body and means connected to said pawls and to said cap for moving the pawls into a gripping position in the body by an upward pull upon said caps, after the insertion of an article into the body a predetermined distance.

8. In a fishing tool, a cylindrical body provided with a plurality of pockets opening into the bore thereof, article gripping pawls normally resting in said body and in article non-gripping position, a cap, means detachably connecting said cap to said body, means connecting said cap and said pawl, and means operable upon contact with an article inserted into said body to release said connection means to permit limited movement of the cap independently of the body.

9. In a fishing tool, a cylindrical body, provided with a plurality of pockets opening out into the bore thereof, article gripping pawls within said pocket and normally lying in an article non-gripping position, a cap, means detachably connecting said cap to said body, a longitudinally movable pin carried by said cap, a disk upon said pin adapted to be engaged by an article upon insertion of the article into the body, to displace said pin, means carried by said pin for releasing the connection between the cap and body upon displacement of the pin, and means connecting the cap and said pawls for moving the pawls into article gripping positions upon movement of the cap away from the body.

10. In a fishing tool, a cylindrical body provided with a plurality of pockets opening out into the bore thereof, pawls normally resting in said pockets and in article non-gripping positions, a cap, means detachably connecting said cap to said body, said body provided with a plurality of longitudinal bores, flexible members extending through said bores and connected to said pawls and said cap for moving the pawls into article gripping positions upon movement of the cap upwardly from the body, and means operable upon contact with the article inserted in the body to release said connecting means.

POETTA TRENT BOYD.